United States Patent
Gropp et al.

(10) Patent No.: US 12,059,978 B2
(45) Date of Patent: Aug. 13, 2024

(54) ASSEMBLY COMPRISING A GUIDE RAIL CONNECTED TO A FLOOR ASSEMBLY

(71) Applicant: Brose Fahrzeugteile SE & Co. Kommanditgesellschaft, Coburg, Coburg (DE)

(72) Inventors: Jörg Gropp, Böhlen (DE); Gregor Kröner, Bischberg (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 55 days.

(21) Appl. No.: 16/973,002

(22) PCT Filed: Jun. 14, 2019

(86) PCT No.: PCT/EP2019/065635
§ 371 (c)(1),
(2) Date: Dec. 7, 2020

(87) PCT Pub. No.: WO2019/243176
PCT Pub. Date: Dec. 26, 2019

(65) Prior Publication Data
US 2021/0252997 A1  Aug. 19, 2021

(30) Foreign Application Priority Data
Jun. 20, 2018 (DE) .................. 10 2018 210 033.0

(51) Int. Cl.
*B60N 2/015* (2006.01)
(52) U.S. Cl.
CPC .................. *B60N 2/015* (2013.01)

(58) Field of Classification Search
CPC ............... B60N 2/015; B60N 2/01508; B60N 2/01516; B60N 2/01525; B60N 2/0155;
(Continued)

(56) References Cited

U.S. PATENT DOCUMENTS 1,335,842 A * 4/1920 Lambert ............... A47B 91/08
248/501
3,113,358 A * 12/1963 Zell ......................... F16B 12/20
52/285.3
(Continued)

FOREIGN PATENT DOCUMENTS

DE     202007015163 U1   3/2008
DE     202008014157 U1   2/2009
(Continued)

*Primary Examiner* — Jonathan Liu
*Assistant Examiner* — Guang H Guan
(74) *Attorney, Agent, or Firm* — Dickinson Wright PLLC (57) ABSTRACT

An assembly of a vehicle comprises a floor assembly stationarily arranged in the vehicle and an adjusting device for longitudinally adjusting a vehicle seat in the vehicle comprising a guide rail connected to the floor assembly and extending along a longitudinal axis on the floor assembly, and an adjustment assembly associated with the vehicle seat, which is guided on the guide rail along the longitudinal axis. It is provided that the guide rail includes at least one connecting element which includes an engagement portion for a form-fitting engagement into an engagement device arranged on the floor assembly on a first side of the guide rail and a connecting portion with a fixing point for fixing the connecting element to the floor assembly by using a fixing element on a second side of the guide rail facing away from the first side.

20 Claims, 5 Drawing Sheets

(58) Field of Classification Search
CPC ............ B60N 2/01558; B60N 2/01575; B60N 2/01583; B60N 2/0715; B60N 2/0722
USPC ..................................... 248/500, 503, 503.1
See application file for complete search history.

(56) References Cited

U.S. PATENT DOCUMENTS

| | | | | |
|---|---|---|---|---|
| 3,806,191 | A * | 4/1974 | Stegmaier | B60N 2/42709 |
| | | | | 248/429 |
| 4,830,422 | A * | 5/1989 | Levitre | B60N 2/0747 |
| | | | | 296/65.13 |
| 5,522,641 | A * | 6/1996 | Infanti | G07F 17/3216 |
| | | | | 297/344.13 |
| 5,527,080 | A * | 6/1996 | Wahlqvist | B60N 2/01541 |
| | | | | 296/63 |
| 6,345,874 | B2 * | 2/2002 | Duong | H02B 1/303 |
| | | | | 248/500 |
| 6,655,739 | B2 * | 12/2003 | Furukawa | B60N 2/0705 |
| | | | | 296/65.13 |
| 10,232,742 | B2 * | 3/2019 | Stemmer | B60N 2/1675 |
| 10,464,444 | B2 * | 11/2019 | Ioppolo | B60N 2/005 |
| 11,535,126 | B2 * | 12/2022 | Nakano | B60N 2/073 |
| 2021/0252997 | A1 * | 8/2021 | Gropp | B60N 2/0722 |

FOREIGN PATENT DOCUMENTS

| | | |
|---|---|---|
| DE | 102013205096 A1 | 5/2014 |
| DE | 102015215592 A1 | 2/2017 |
| EP | 0116279 A1 | 8/1984 |
| EP | 0171660 A1 | 2/1986 |
| EP | 0283356 A1 | 9/1988 |
| FR | 2500383 A1 | 8/1982 |
| FR | 2794408 A1 | 12/2000 |

* cited by examiner

ASSEMBLY COMPRISING A GUIDE RAIL CONNECTED TO A FLOOR ASSEMBLY

CROSS-REFERENCE TO RELATED APPLICATIONS

This application is the U.S. National Phase of PCT Application No. PCT/EP2019/065635 filed on Jun. 14, 2019, which claims priority to German Patent Application No. DE 10 2018 210 033.0, filed on Jun. 20, 2018, the disclosures of which are hereby incorporated in their entirety by reference herein.

TECHNICAL FIELD

The present disclosure relates to an assembly of a vehicle such as an adjustment assembly configured to adjust a vehicle seat.

BACKGROUND

Such an assembly comprises a floor assembly stationarily arranged in the vehicle and an adjusting device for the longitudinal adjustment of a vehicle seat in a vehicle comprising a guide rail connected to the floor assembly and extended along a longitudinal axis on the floor assembly, and an adjustment assembly associated with the vehicle seat and guided along the longitudinal axis on the guide rail.

In a conventional vehicle, a vehicle seat can be adjusted relative to a vehicle floor by means of a longitudinal adjustment device, as it is known for example from DE 10 2015 215 592 A1. Guide rails here extend parallel to each other on both sides of the vehicle seat in order to shift the vehicle seat forward or backward in the vehicle and in this way adjust a comfortable position for a vehicle occupant.

Conventional guide rails are comparatively short, for example shorter than 50 cm, in order to be able to adjust the vehicle seat between a front position and a rear position. To connect such comparatively short guide rails to a floor assembly, holes are conventionally drilled into a base of the respective guide rail in order to screw the respective guide rail to the floor assembly through the holes and thus mount it in the vehicle.

In connection with new vehicle technologies, in particular in connection with autonomous driving, it may be desirable to make an adjustment range for a vehicle seat considerably larger, for example to be able to shift a vehicle seat in a vehicle far backwards. To this end, it is being considered to use significantly longer guide rails, in particular with a length greater than 50 cm, which in turn are to be firmly connected to a floor assembly of the vehicle.

The drilling of holes into guide rails to fix the guide rails in a vehicle is expensive in terms of manufacture and thus contributes to the cost of the vehicle seat. This is even more pronounced with longer guide rails that would require more holes to connect the guide rails along their length to the associated floor assembly of the vehicle. When guide rails are manufactured as roller-burnished sections, this can make the drilling of holes even more difficult and thus more expensive. Due to the geometry of the guide rails, a fixation of the guide rails to an associated floor assembly via holes in a base possibly may also be excluded entirely.

Thus, it is desirable to facilitate the installation of especially long guide rails on a vehicle floor for mounting an adjusting device for adjusting a vehicle seat in a vehicle.

SUMMARY

One or more objects of the present disclosure may be to provide an assembly for use in a vehicle and a method for mounting an adjusting device, which provide for a simple, inexpensive installation especially of the guide rail in a vehicle.

Accordingly, the guide rail has at least one connecting element which includes an engagement portion for form-fitting engagement in an engagement device arranged on the floor assembly on a first side of the guide rail and a connecting portion having a fixing point for fixing the connecting element to the floor assembly by using a fixing element on a second side of the guide rail facing away from the first side.

Accordingly, the guide rail is not (no longer) connected to the floor assembly via holes in a base of the guide rail, but is instead attached to the floor assembly via a connecting element associated with the guide rail. The connecting element on the one hand includes an engagement portion for producing a positive connection and also a connecting portion for producing, for example, non-positive connection, such as a screw or rivet connection.

By using one or more connecting elements on the guide rail to fix the guide rail to the floor assembly, holes in the base of the guide rail are no longer required. This also eliminates the need to insert screws or other fixing elements into the guide rail to mount the guide rail on the floor assembly and pass them through holes in the base of the guide rail, which can considerably facilitate the installation.

To connect the guide rail to the floor assembly, the guide rail rather is fixed to the floor assembly via one or more connecting elements. The engagement portion of each connecting element therefor is brought into engagement with an associated engagement device on the floor assembly in a form-fitting way, and the connecting portion of each connecting element is fixed to the floor assembly via its fixing point, for example by a screw or rivet connection. To mount the guide rail on the floor assembly, one or more connecting elements each are inserted into an associated engagement device with their engagement portion and additionally fixed to the floor assembly via the connecting portion so that the guide rail is firmly mounted on the floor assembly.

Due to the fact that the engagement portion is used for the form-fitting engagement in an engagement device arranged on the floor assembly on a first side of the guide rail and the connecting portion on the other hand is used for fixing the connecting element to the floor assembly by using a fixing element on a second side of the guide rail facing away from the first side, a connection of the guide rail to the floor assembly is effected via the connecting element on different sides. On the first side, the connecting element and thus the guide rail is fixed to the floor assembly in a form-fitting way. On the second side facing away from the first side, the connecting element, on the other hand, is fixed to the floor assembly via the fixing element, for example by screwing. This can, for example, provide for an easy installation because the engagement portion can be easily inserted into the associated engagement device of the floor assembly in order to then connect the connecting element to the floor assembly via the fixing portion on the side facing away from the engagement portion.

As an example, the connecting element can be of flat, for example rod-shaped design. As another example, the connecting element can extend horizontally (when properly mounted in a vehicle) and protrude from the guide rail on different sides with its engagement portion on the one hand and its connecting portion on the other hand.

The fixing point of the connecting portion can, for example, be configured as an opening for receiving a fixing element in the form of a screw or rivet element. To mount the guide rail on the floor assembly, a fixing element thus is inserted into the fixing point in the shape of the opening, so as to screw or rivet the connecting element to the floor assembly via a connecting portion.

In one embodiment, the engagement portion and the connecting portion protrude from the guide rail on different sides transversely to the longitudinal axis. The engagement portion and the connecting portion thus are spaced apart from each other and arranged on different sides of the guide rail. The engagement portion and the connecting portion may each protrude from the guide rail along a transverse direction transversely to the longitudinal axis, so that the guide rail can be positively connected to the associated engagement device of the floor assembly via the at least one connecting element on the one hand and can be fixed to the floor assembly via the connecting portion on the other side of the guide rail. Due to the fact that the engagement portion and the connecting portion protrude laterally from the guide rail, it is not necessary to access the interior of the guide rail to mount the guide rail on the floor assembly, which can considerably simplify the installation.

The use of one or more connecting elements for fixing the guide rail to the floor assembly also provides for a favorable force introduction when a vehicle seat is loaded, for example in the event of a crash. As an example, when the engagement portion and the connecting portion protrude from the guide rail on different sides, forces can be introduced into the floor assembly on both sides of the guide rail in a favorable, evenly distributed way.

In one or more embodiments, the floor assembly may be arranged below an actual vehicle floor visible from the vehicle interior, for example, covered with a carpet, and for example can be formed by sills of the vehicle body. Because the guide rail in the mounted position thus is arranged below the actual vehicle floor and is not visible from the vehicle interior, connecting elements on the guide rail do not impair the aesthetic impression in the vehicle. The attachment of the guide rail to the floor assembly via laterally protruding engagement portions and connecting portions of the connecting elements associated with the guide rail may not visible from the interior of the vehicle.

In one embodiment, the engagement device forms an engagement opening into which the engagement portion of an associated connecting element engages in a form-fitting way when the guide rail is mounted. The engagement device can be configured for example in the form of a tab and form an undercut with which the engagement portion of an associated connecting element can be engaged in a form-fitting way so as to provide a positive connection of the guide rail to the floor assembly.

In one embodiment, the engagement device for example has a U-shaped design—as seen in cross-section along a plane defined by the longitudinal axis and a height direction extending perpendicularly to the longitudinal axis and to the transverse direction—formed by a base and legs arranged laterally on the base. The legs and the base jointly form the engagement opening, and the engagement device can be attached to a surface portion of the floor assembly, and may be welded to the floor assembly, for example via its legs, for example via mounting flanges arranged at ends of the legs remote from the base.

The width of the engagement opening along the longitudinal axis may be defined by the distance of the legs from each other. The distance of the legs to each other can be dimensioned—in accordance with the width of the engagement portion measured along the longitudinal axis—in such a way that the engagement portion, when it is inserted into the engagement opening of the engagement device, is fixed in the engagement opening substantially without play. By means of the form-fitting engagement of the engagement portion in the engagement opening of the associated engagement device, the guide rail thus is fixed to the floor assembly substantially without play along the longitudinal axis.

In addition or alternatively, it is conceivable and possible that the guide rail is fixed to the floor assembly substantially without play along the height direction (perpendicular to the surface portion of the floor assembly) via the form-fitting engagement in the engagement device.

Alternatively, the engagement opening can be designed in such a way that, when the engagement portion is inserted, some play exists between the engagement portion and the engagement device, such as along the longitudinal axis. This can be favorable for the purpose of tolerance compensation.

In one embodiment, each connecting element is welded, such as laser-welded, to a base of the guide rail. For example, the guide rail has a U-shaped profile—in a cross-section perpendicular to the longitudinal axis—with a base and lateral legs arranged at the base, between which the adjustment assembly associated with the vehicle seat is guided. One or more connecting elements are connected to the base and are thus attached to the guide rail, and the connecting elements protrude on both sides of the guide rail and the engagement portions and the connecting portions and a fixation of the guide rail to the floor assembly may be effected outside the interior space of the guide rail formed between the legs.

In another embodiment, the guide rail includes a plurality of connecting elements spaced apart from each other along the longitudinal axis. The connection of the guide rail to the floor assembly thus is effected via a plurality of connecting elements, which are, for example, evenly distributed on the guide rail along the longitudinal axis and thus provide for a fixation of the guide rail to the floor assembly along its entire length. For example, each connecting element protrudes from the guide rail on one side with its engagement portion and on the other side with its connecting portion, and each connecting element is associated with an engagement device on the floor assembly so that each connecting element can be positively fixed to the floor assembly via its engagement portion and can be connected to the floor assembly via the connecting portion, for example by means of a screw or rivet connection.

In one embodiment, two guide rails can be associated with the vehicle seat, which are arranged on both sides of the vehicle seat. Each guide rail here includes one or more connecting elements of the type described above for fixing the respective guide rail to the floor assembly.

The object also is achieved by a method for mounting an adjusting device for the longitudinal adjustment of a vehicle seat in a vehicle. In the method, a guide rail extending along a longitudinal axis for guiding an adjustment assembly associated with the vehicle seat is connected to a floor assembly stationarily arranged in the vehicle. It is provided here that for connecting the guide rail to the floor assembly, at least one connecting element of the guide rail including an engagement portion and a connecting portion is positively connected to an engagement device arranged on the floor assembly via the engagement portion on a first side of the guide rail and then is fixed to the floor assembly via the connecting portion by using a fixing element on a second side of the guide rail facing away from the first side.

Thus, the guide rail is mounted in the vehicle by first inserting an engagement portion of at least one connecting element into an associated engagement device of the floor assembly. Then, the connecting element and hence the guide rail is connected to the floor assembly via the connecting portion, for example via a screw or rivet connection, so that the guide rail is fixed to the floor assembly.

The advantages and advantageous embodiments described above for the assembly analogously are also applicable to the method, so that reference is made to the above explanations.

BRIEF DESCRIPTION OF THE DRAWINGS

The idea underlying the invention will be explained in detail below with reference to the exemplary embodiments illustrated in the Figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
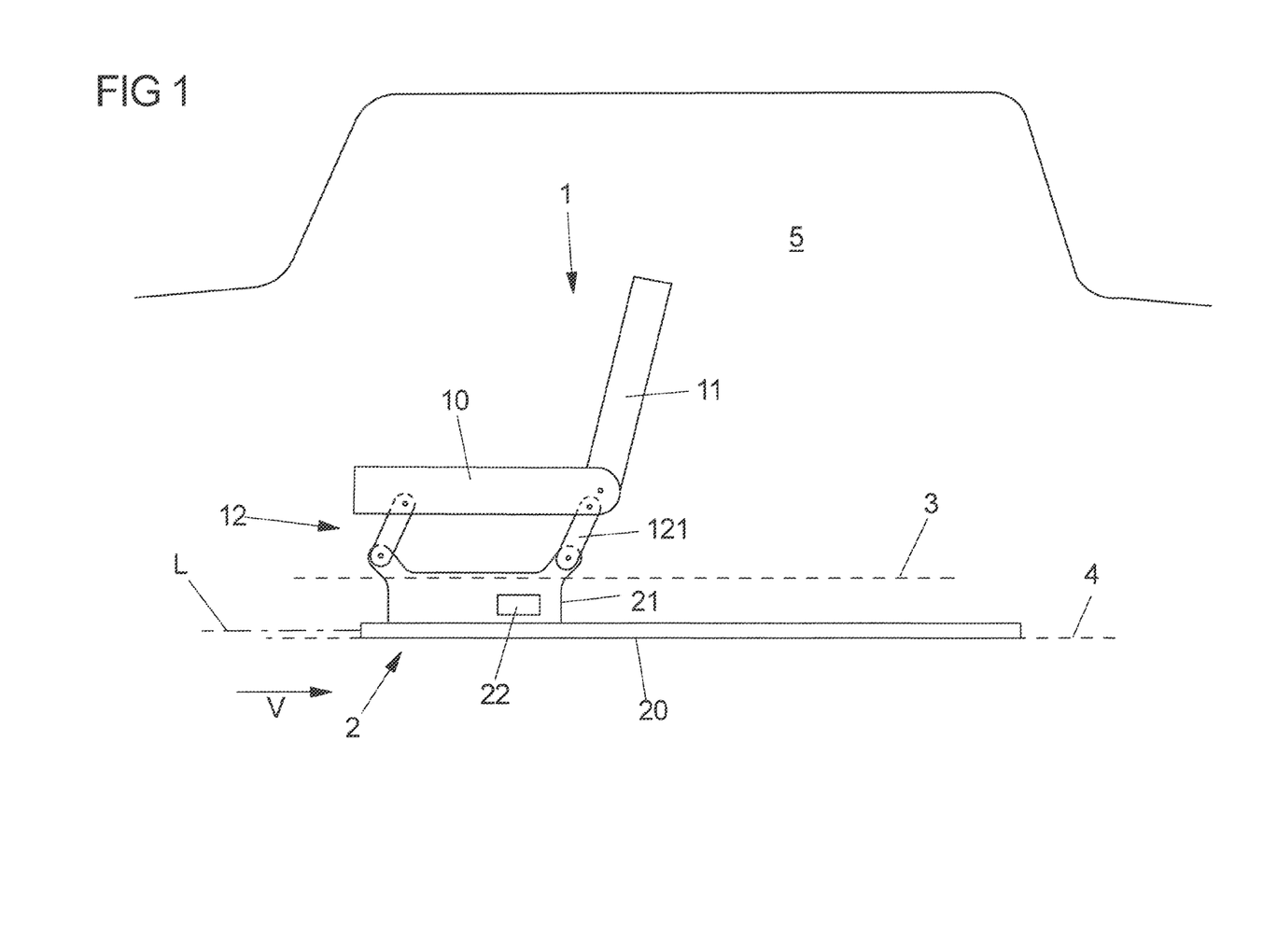
FIG. 1 shows a schematic view of a vehicle seat on an arrangement of guide rails.

A vehicle seat 1, as shown schematically in FIG. 1, includes a seat part 10 and a backrest 11 pivotally arranged on the seat part 10. Such a vehicle seat 1 can, for example, realize a vehicle front seat in the first row of seats in a vehicle 5, but can also be designed as a vehicle rear seat for example in the second or third row of seats.

The vehicle seat 1 is connected to an adjustment assembly 21 of a longitudinal adjustment device 2 via a height adjustment device 12. In connection with the height adjustment direction 12, coupling elements 121 in the form of swing arms pivotally connected to both the seat part 10 and the adjustment assembly 21 for the purpose of adjusting the height of the vehicle seat 1 are pivotable relative to the adjustment assembly 21, so that the seat part 10 can be lowered or raised to set a comfortable seating position for a vehicle occupant.

The longitudinal adjustment device 2 includes an arrangement of guide rails 20 extending parallel to each other (see also FIGS. 2 and 3), each of which extends along a longitudinal axis L and is firmly connected to a floor assembly 4 of the vehicle 5 and each slidingly guide an adjustment assembly 21 along an adjustment direction V directed parallel to the longitudinal axis L. By means of an electromotive driving device 22 each, realized for example as a spindle drive including a spindle 220 (see FIG. 5), the adjustment assemblies 21 can be adjusted on the guide rails 20 in order to adapt a longitudinal position of the vehicle seat 1 along the adjustment direction V.

In the illustrated exemplary embodiment, the floor assembly 4, for example realized by sills of the vehicle body, is arranged below an actual vehicle floor 3, visible from the vehicle interior and covered by a carpet. The guide rails 20 thus are not visible from inside the vehicle when used as intended, but are hidden underneath the vehicle floor 3.

Figure 5:
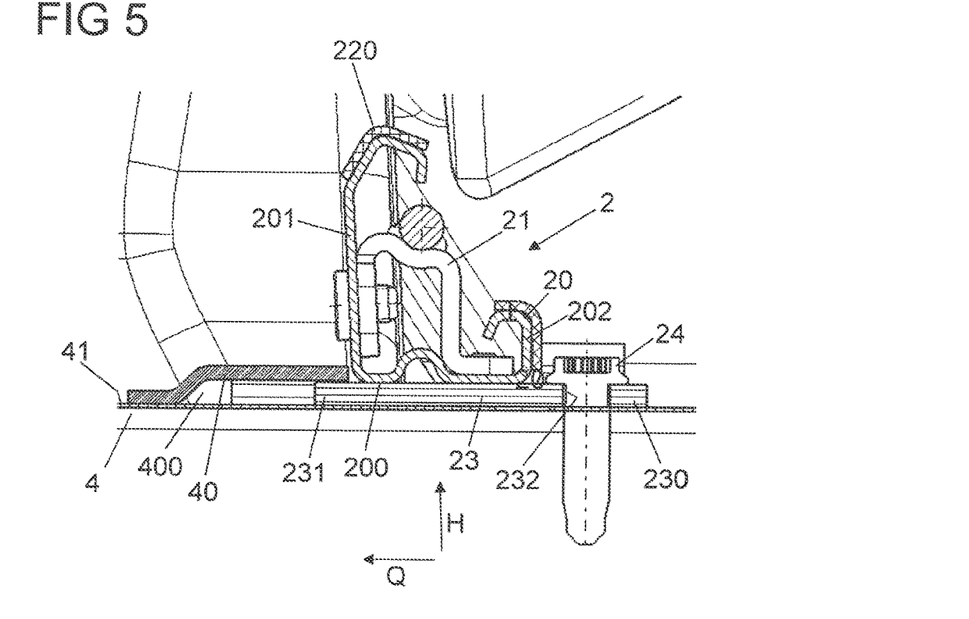
FIG. 5 shows a cross-sectional view through the guide rail as shown in FIG. 4.

In the exemplary embodiment of FIGS. 2 to 5, the guide rails 20 are each fixed to the floor assembly 4 via a plurality of connecting elements 23 offset from each other along the longitudinal axis L. As can be seen in FIG. 5, each connecting element 23 here has the shape of a rod element which is connected, for example welded (for example, laser-welded), to a base 200 of the respectively associated guide rail 20 and protrudes from both sides of the guide rail 20 along a transverse direction Q extending transversely to the longitudinal axis L.

Thus, each connecting element 23 with an engagement portion 231 on the one hand protrudes from the guide rail 20 with respect to a first lateral leg 201 arranged on the base 200 of the guide rail 20. On the other hand, the connecting element 23 with a connecting portion 230 protrudes from the guide rail 20 with respect to a second lateral leg 202 arranged at the base 200 of the guide rail 20.

The connecting elements 23 are used to connect the guide rails 20 to the floor assembly 4. With each connecting element 23 an engagement device 40 on the vehicle floor 4 is associated, which serves to connect the respectively associated connecting element 23 to the floor assembly 4 in a form-fitting way.

Figure 7:
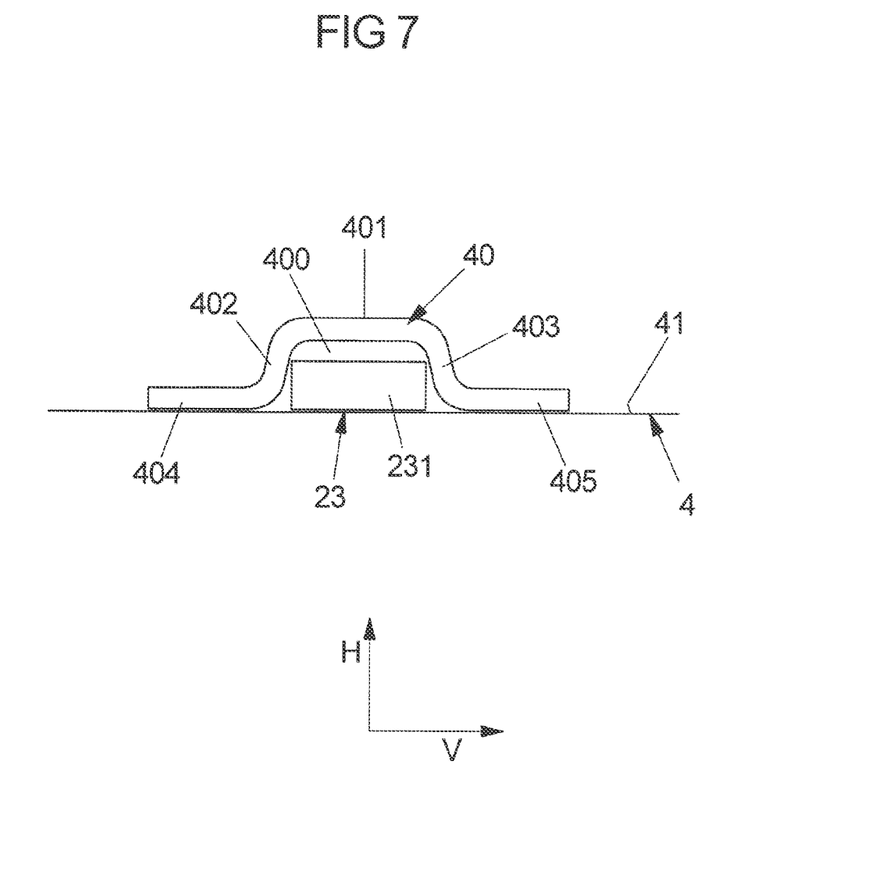
FIG. 7 shows a schematic view of an engagement device of the floor assembly together with an engagement portion of a connecting element of the guide rail.

Each engagement device 40 has a U-shaped design—in a cross-section perpendicular to the transverse direction Q—comprising a base 401 and lateral legs 402, 403 arranged on the base 401, as this is shown in FIG. 7. Together with the base 401, the legs 402, 403 form an engagement opening 400 which provides for a form-fitting engagement of the engagement portion 231 of the associated connecting element 23. Via mounting flanges 404, 405, which are arranged on the legs 402, 403 at ends remote from the base 401, the engagement device 40 is connected to a surface portion 41 of the floor assembly 4, for example welded, for example laser-welded, to the surface portion 41.

The clear width of the engagement opening 400 between the legs 402, 403, measured along the adjustment direction V parallel to the longitudinal axis L, can be dimensioned in such a way that the associated engagement portion 231 is received in the engagement opening 400 without play. Alternatively, a clearance also can exist between the legs 402, 403 and the engagement portion 231 so that tolerances can be compensated during the assembly.

Figure 2:
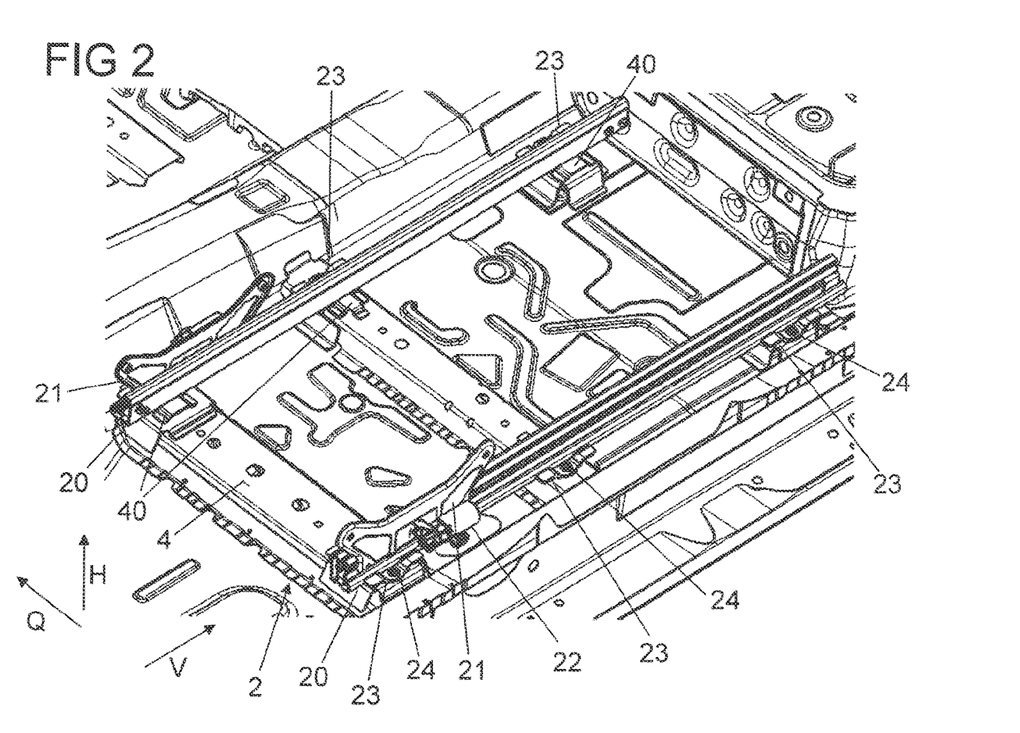
FIG. 2 shows a view of an adjusting device with two guide rails extending longitudinally on a floor assembly.
Figure 3:
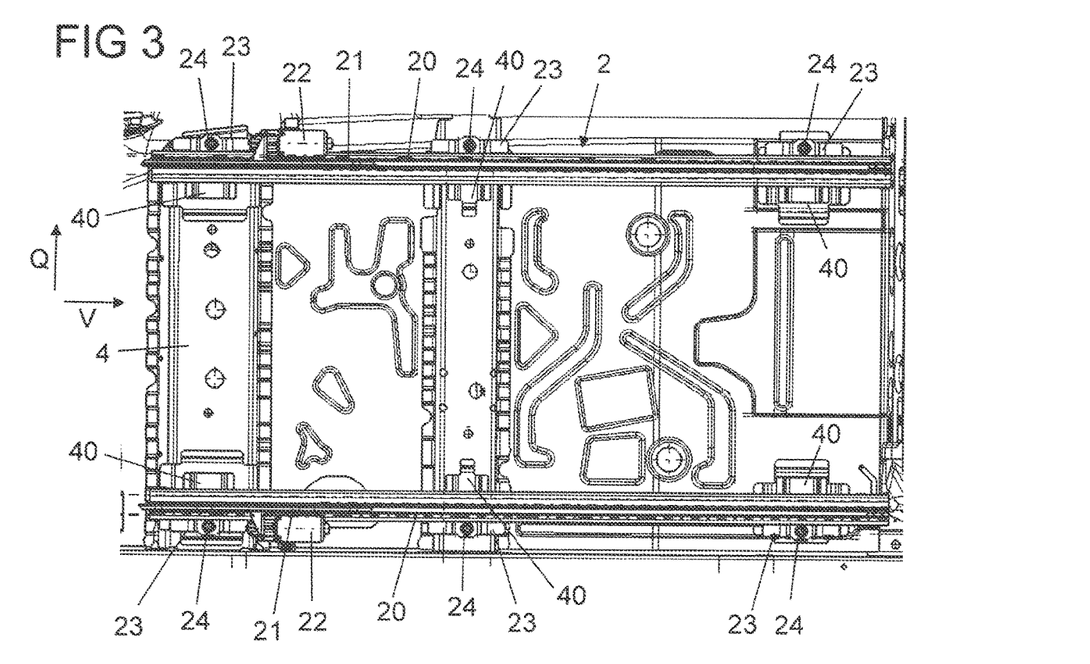
FIG. 3 shows a view the arrangement as shown in FIG. 2 from above.
Figure 4:
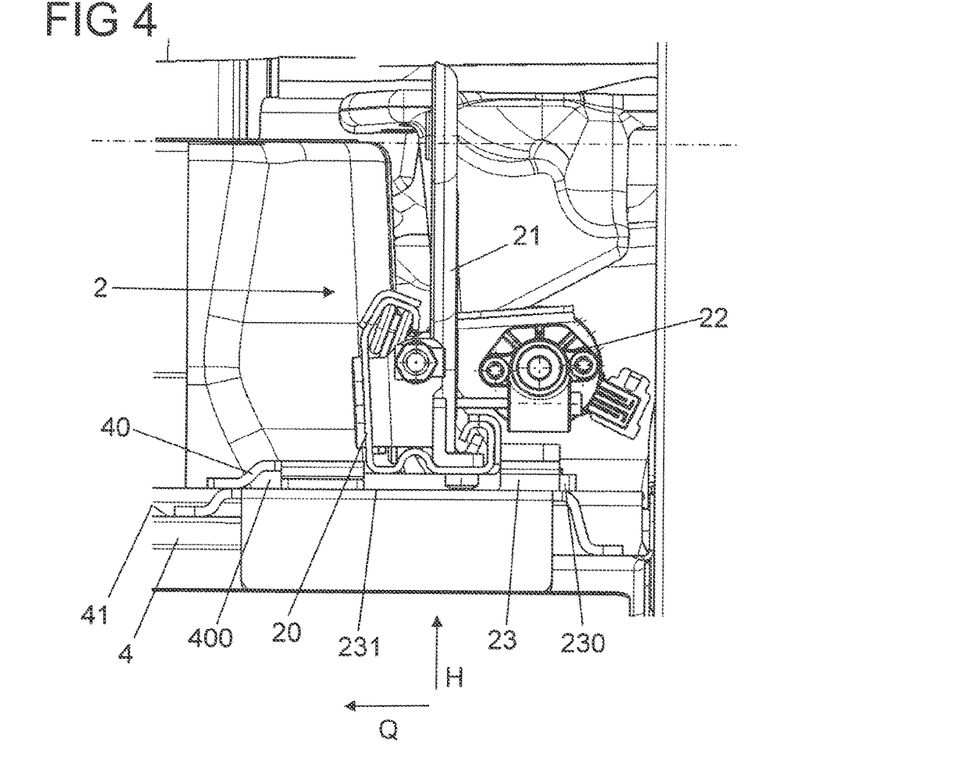
FIG. 4 shows a front view of a guide rail of the arrangement as shown in FIG. 2.

As shown in FIGS. 2 and 3, an engagement device 40 is associated with each connecting element 23 on the floor assembly 4. For installation, each guide rail 20 initially is inserted with the engagement portions 231 of the connecting elements 23 into the engagement openings 400 of the associated engagement devices 40 and then frictionally fixed to the floor assembly 4 by mounting fixing elements 24 in the form of screws or rivets at fixing points 232 in the form of openings in the connecting portions 230 of the connecting elements 23.

Due to the fact that the positive connection is effected via the engagement portions 231 and the connection via the fixing elements 24 on different sides of the guide rail 20 and, in addition, a plurality of connecting elements 23 are provided on each guide rail 20 spaced apart from each other along the longitudinal axis L, a favorable fixation of the guide rail 20 to the floor assembly 4 is obtained along with a favorable introduction of forces under load. Due to the fact that the interior of the guide rail 20 need not be accessed for installation, the installation is effected easily and at low cost.

Figure 6:
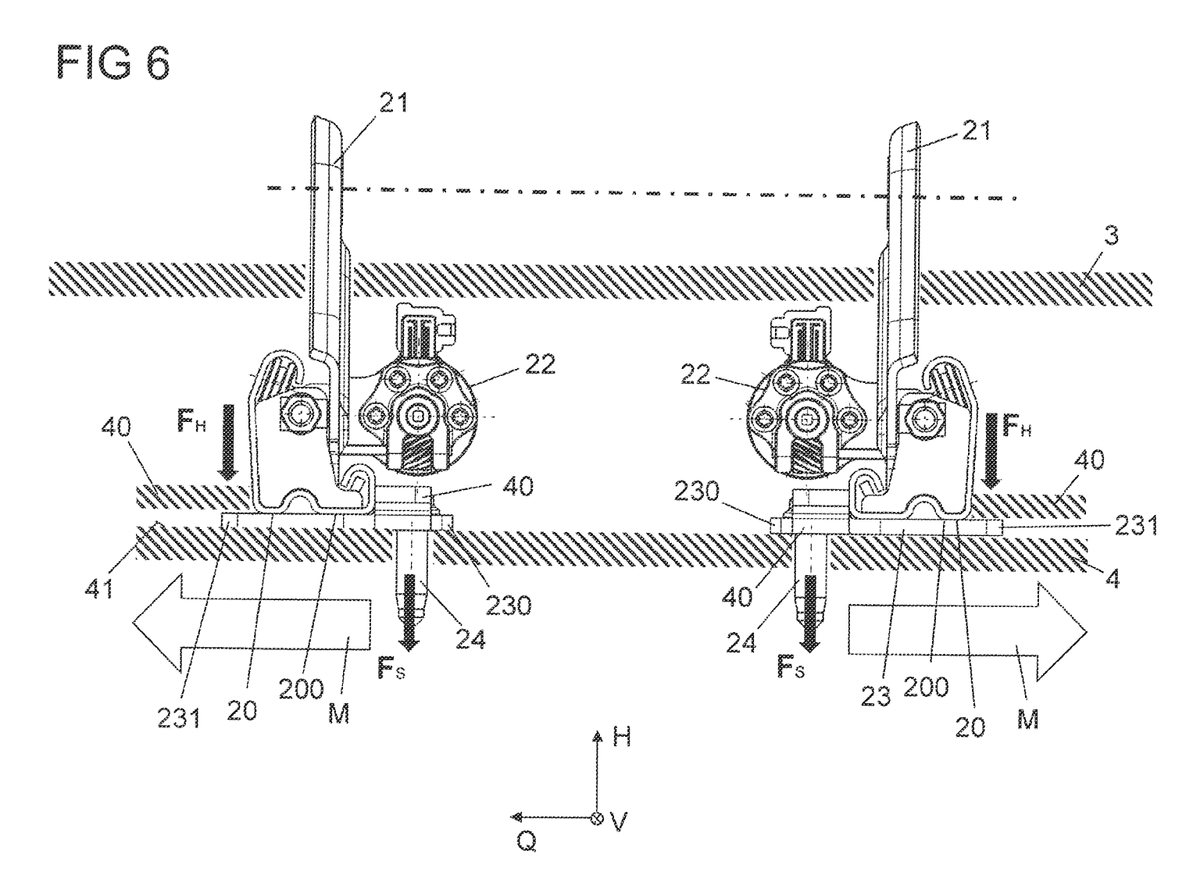
FIG. 6 shows a view of the guide rails, representing a force introduction of the guide rails into the floor assembly.

In the mounted position, as shown in FIG. 6, the engagement devices 40 on the one hand absorb form-fit forces $F_H$. On the other hand, screwing forces $F_S$ are introduced into the floor assembly 4 via the connecting portions 230. This results in a favorable force introduction into the floor assembly 4 when the vehicle seat 1 is loaded.

FIG. 6 also shows the mounting direction M extending along the transverse direction Q, in which the respective guide rails 20 with the engagement portions 231 of the connecting elements 23 are to be inserted into the associated engagement devices 40 in order to mount the guide rails 20 on the floor assembly 4.

Due to the fact that the guide rails 20 are arranged below the actual vehicle floor 3 and thus concealed with respect to the vehicle interior, the connecting elements 23 with their connecting portions 230 and engagement portions 231 protruding from the guide rails 20 do not impair the aesthetic impression in the vehicle interior.

The idea underlying the invention is not limited to the exemplary embodiments described above, but can also be realized in principle in a completely different way.

In principle, one or more guide rails can be associated with the vehicle seat. For future vehicle seats, it is also conceivable to arrange a vehicle seat in a vehicle in such a way that it is only longitudinally adjustable via a single guide rail, so that in this case a single guide rail on one side of the vehicle seat or centrally under the vehicle seat may be sufficient.

As an example, a vehicle seat of the type in question here can also be rotatable in such a way that it can be moved into a forward or rearward facing seating position in the vehicle.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 vehicle seat
10 seat part
11 backrest part
12 height adjustment device
121 coupling element
2 adjusting device
20 guide rail
200 base
201, 202 leg
21 adjustment assembly
22 driving device
220 spindle
23 connecting element
230 connecting portion
231 engagement portion
232 fixing point
24 screw or rivet element
3 vehicle floor
4 floor assembly
40 engagement device (angular element)
400 engagement opening
401 base
402, 403 leg
404, 405 mounting flange
41 surface portion
5 vehicle
$F_S$ screwing force
$F_H$ form-fit force
H height direction
L longitudinal axis
M mounting direction
Q transverse direction
V adjustment direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A seat assembly for use in a vehicle, the seat assembly comprising:
    a floor assembly configured to be disposed in the vehicle;
    a plurality of engagement devices disposed on the floor assembly;
    a plurality of fixing elements;
    a vehicle seat; and
    an adjustment device configured to longitudinally adjust the vehicle seat and including:
    a guide rail connected to the floor assembly and extending along a longitudinal axis defined by the floor assembly, wherein the guide rail includes a plurality of connecting elements, each connecting element of the plurality of connecting elements comprising an engagement portion and a connecting portion, each of the connecting portions defining a fixing point; and
    an adjustment assembly disposed on and guided by the guide rail, the adjustment assembly being connected to the vehicle seat;
    wherein the plurality of engagement devices are disposed on a first side of the guide rail and engage the engagement portions of the plurality of connecting elements to form a plurality of form-fitting engagements; and
    wherein the plurality of fixing elements are disposed on a second side of the guide rail, facing away from the first side of the guide rail, and fix the plurality of connecting elements to the floor assembly at the fixing points of the connecting portions; and
    wherein each connecting element of the plurality of connecting elements has a rod shape extending transverse with respect to the longitudinal axis, a first end of each connecting element of the plurality of connecting elements protruding from the guide rail on the first side and forming the engagement portion and a second end of each connecting element of the plurality of connecting elements protruding from the guide rail on the second side and forming the connecting portion.

2. The seat assembly of claim 1, wherein at least one fixing point of the fixing points is an opening configured to receive one fixing element of the plurality of fixing elements.

3. The seat assembly of claim 1, wherein at least one engagement portion of the engagement portions of the plurality of connecting elements and at least one connecting portion of the connecting portions of the plurality of connecting elements protrude from the guide rail in opposing directions, wherein the opposing directions are each transverse to the longitudinal axis.

4. The seat assembly of claim 1, wherein each engagement device of the plurality of engagement devices defines an engagement opening, wherein the engagement portions of the plurality of connecting elements extend into and engage the engagement openings of the plurality of engagement devices to form the plurality of form-fitting engagements.

5. The seat assembly of claim 4, wherein each engagement device of the plurality of engagement devices includes a base and a plurality of legs each extending from the base, wherein the base and the plurality of legs of each engagement device of the plurality of engagement devices collectively form the engagement opening.

6. The seat assembly of claim 5, wherein the plurality of legs of each engagement device of the plurality of engagement devices are connected to a surface portion of the floor assembly.

7. The seat assembly of claim 5, wherein the engagement portion of each of the plurality of connecting elements is disposed between the plurality of legs of a respective engagement device of the plurality of engagement devices so that the engagement portion of each of the plurality of connecting elements is received in the engagement opening of the respective engagement device of the plurality of engagement devices to prevent movement of the engagement portion of each of the plurality of connecting elements with respect to the respective engagement device of the plurality of engagement devices.

8. The seat assembly of claim 1, wherein at least one connecting element of the plurality of connecting elements is welded to a base of the guide rail.

9. The seat assembly of claim 8, wherein the plurality of connecting elements are laser welded to the base of the guide rail.

10. The seat assembly of claim 1, wherein the plurality of connecting elements are spaced apart from one another along the longitudinal axis.

11. A seat adjuster for use in a vehicle and configured to adjust a vehicle seat along a longitudinal direction with respect to a vehicle floor, the seat adjuster comprising:
   a floor assembly configured to be disposed below the vehicle floor;
   a first engagement device lying along a surface of the floor assembly and including a raised portion spaced apart from the surface;
   a guide rail extending along a longitudinal axis defined by the floor assembly;
   an adjustment assembly configured to translate along the guide rail;
   a connecting member fixed to the guide rail, wherein the connecting member includes a first portion disposed on a first side of the guide rail and a second portion disposed on a second side of the guide rail, the first side opposing the second side, wherein the raised portion sandwiches the first portion of the connecting member to the surface of the floor assembly; and
   a fixing element configured to fix the second portion of the connecting member to the floor assembly;
   wherein the connecting member has a rod shape extending transverse with respect to the longitudinal axis, a first end of the connecting member protruding from the guide rail on the first side and forming the first portion and a second end of the connecting member protruding from the guide rail on the second side and forming the second portion.

12. The seat adjuster of claim 11, wherein the fixing element is a pin, wherein the pin extends through an aperture defined by the second portion of the connecting member.

13. The seat adjuster of claim 11, wherein the fixing element is a threaded fastener or a rivet.

14. The seat adjuster of claim 11, wherein the connecting member is fixed to the surface and extends along a transverse direction oriented transverse to the longitudinal axis.

15. The seat adjuster of claim 14, further comprising:
   a second engagement device spaced apart from the first engagement device along the longitudinal axis.

16. The seat adjuster of claim 11, wherein the connecting member is laser welded to a base of the guide rail.

17. The seat adjuster of claim 11, wherein the surface and the raised portion collectively engage the first portion of the connecting member to form a form-fitting engagement.

18. A method of assembling a seat adjuster for use in a vehicle, the vehicle including a vehicle floor assembly, the method comprising:
   inserting a first portion of a connecting member, fixed to a guide rail extending along a longitudinal axis, into an opening formed between a vehicle floor assembly surface of the vehicle floor assembly and a raised surface of an engagement device fixed to the vehicle floor assembly surface;
   wherein the raised surface and the first portion are each disposed on a first side of the guide rail,
   wherein the connecting member has a rod shape extending transverse with respect to the longitudinal axis, a first end of the connecting member protruding from the guide rail on the first side and forming the first portion; and
   inserting a fixing element into a second portion of the connecting member and an aperture defined by the vehicle floor assembly surface to fix the second portion of the connecting member and the guide rail to the vehicle floor assembly surface,
   wherein the second portion of the connecting member is disposed on a second side of the guide rail, wherein the second side of the guide rail opposes the first side of the guide rail, and
   wherein a second end of the connecting member protrudes from the guide rail on the second side and forms the second portion.

19. The method of claim 18, further comprising:
   welding the connecting member to a base portion of the guide rail.

20. The method of claim 18, further comprising:
   fastening the fixing element to the vehicle floor assembly.

* * * * *